United States Patent
Musoll et al.

(10) Patent No.: US 7,634,622 B1
(45) Date of Patent: Dec. 15, 2009

(54) PACKET PROCESSOR THAT GENERATES PACKET-START OFFSETS TO IMMEDIATELY STORE INCOMING STREAMED PACKETS USING PARALLEL, STAGGERED ROUND-ROBIN ARBITRATION TO INTERLEAVED BANKS OF MEMORY

(75) Inventors: Enrique Musoll, San Jose, CA (US);
Mario Nemirovsky, Saratoga, CA (US);
Jeffrey Huynh, Cambell, CA (US)

(73) Assignee: Consentry Networks, Inc., Milpitas, CA (US)

( * ) Notice: Subject to any disclaimer, the term of this patent is extended or adjusted under 35 U.S.C. 154(b) by 484 days.

(21) Appl. No.: 11/309,662

(22) Filed: Sep. 7, 2006

Related U.S. Application Data

(63) Continuation-in-part of application No. 11/152,879, filed on Jun. 14, 2005.

(51) Int. Cl.
*G06F 12/00* (2006.01)
*G06F 13/00* (2006.01)
*G06F 13/28* (2006.01)

(52) U.S. Cl. .................. 711/151; 711/147; 711/148; 711/149; 711/150; 711/202; 370/395.4; 370/395.41; 370/395.42; 370/375; 370/376; 709/214; 709/215; 709/240

(58) Field of Classification Search .......... 711/147, 711/151
See application file for complete search history.

(56) References Cited

U.S. PATENT DOCUMENTS

| | | | |
|---|---|---|---|
| 5,168,547 A | 12/1992 | Miller et al. ................. 710/1 |
| 5,285,421 A | 2/1994 | Young et al. ............. 365/230.04 |
| 5,453,957 A | 9/1995 | Norris et al. ............. 365/230.04 |
| 5,559,986 A | 9/1996 | Alpert et al. ............... 711/144 |
| 5,729,709 A | 3/1998 | Harness .................... 711/5 |
| 5,737,761 A | 4/1998 | Holland et al. ............ 345/531 |
| 5,740,402 A | 4/1998 | Bratt et al. ................. 711/157 |
| 5,903,509 A * | 5/1999 | Ryan et al. ............. 365/230.03 |
| 5,924,111 A | 7/1999 | Huang et al. .................. 711/5 |
| 5,935,230 A | 8/1999 | Pinai et al. .................. 710/111 |
| 5,995,519 A | 11/1999 | Miwa ...................... 370/509 |
| 6,052,386 A | 4/2000 | Achilleoudis et al. ....... 370/470 |
| 6,205,524 B1 | 3/2001 | Ng ............................ 711/151 |
| 6,427,196 B1 | 7/2002 | Adiletta et al. ............. 711/158 |
| 6,493,342 B1 | 12/2002 | Breslow et al. ............ 370/394 |
| 6,505,269 B1 * | 1/2003 | Potter ....................... 711/202 |

(Continued)

*Primary Examiner*—Christian P Chace
*Assistant Examiner*—Prasith Thammavong
(74) *Attorney, Agent, or Firm*—gPatent LLC; Stuart T. Auvinen

(57) ABSTRACT

A shared memory stores packets for a packet processor. The shared memory is arranged into banks that are word-interleaved. All banks may be accessed in parallel during each time-slot by different requesters. A staggered round-robin arbiter connects requesters to banks in a parallel fashion. Requestor inputs to the arbiter are staggered to allow access to different banks in a sequential order over successive time-slots. Multi-processor tribes have many processors that generate random requests to the shared memory. A slot scheduler arranges these random requests into a stream of sequential requests that are synchronized to the staggered round-robin arbiter. A packet interface requestor stores incoming packets from an external network into the shared memory. The packet's offset within pages of the shared memory is determined by the first available bank that the packet can be written to, eliminating delays in storing incoming packets and spreading storage of frequently-accessed fields.

15 Claims, 14 Drawing Sheets

U.S. PATENT DOCUMENTS

| | | |
|---|---|---|
| 6,633,576 B1 | 10/2003 | Melaragni et al. ............ 370/412 |
| 6,745,277 B1 | 6/2004 | Lee et al. ........................ 711/5 |
| 6,779,073 B2 | 8/2004 | McLaughlin et al. ......... 711/100 |
| 6,895,459 B2 | 5/2005 | Hadwiger et al. ............ 710/111 |
| 6,944,171 B2 | 9/2005 | Ahlfors et al. .............. 370/412 |
| 7,065,096 B2 | 6/2006 | Musoll et al. ................ 370/412 |
| 2003/0069920 A1 | 4/2003 | Melvin et al. ................ 718/108 |
| 2003/0088744 A1* | 5/2003 | Jain et al. .................... 711/150 |
| 2003/0204665 A1* | 10/2003 | Jain et al. ........................ 711/5 |
| 2005/0071574 A1* | 3/2005 | Frenzel et al. ............... 711/148 |
| 2005/0243734 A1 | 11/2005 | Nemirovsky et al. ......... 370/252 |
| 2006/0174158 A1 | 8/2006 | Check et al. .................. 714/10 |

\* cited by examiner

TIME ⟶

| SLOT_CNT → | 0 | 1 | 2 | 3 | 4 | 5 | 6 | 7 | 0 | 1 | 2 | 3 | 4 | 5 |
|---|---|---|---|---|---|---|---|---|---|---|---|---|---|---|
| BANK 0 | V0 | V2 | V4 | V6 | IN | OUT | CR | CW | V0 | V2 | V4 | V6 | IN | OUT |
| BANK 1 | CW | V0 | V2 | V4 | V6 | IN | OUT | CR | CW | V0 | V2 | V4 | V6 | IN |
| BANK 2 | CR | CW | V0 | V2 | V4 | V6 | IN | OUT | CR | CW | V0 | V2 | V4 | V6 |
| BANK 3 | OUT | CR | CW | V0 | V2 | V4 | V6 | IN | OUT | CR | CW | V0 | V2 | V4 |
| BANK 4 | IN | OUT | CR | CW | V0 | V2 | V4 | V6 | IN | OUT | CR | CW | V0 | V2 |
| BANK 5 | V6 | IN | OUT | CR | CW | V0 | V2 | V4 | V6 | IN | OUT | CR | CW | V0 |
| BANK 6 | V4 | V6 | IN | OUT | CR | CW | V0 | V2 | V4 | V6 | IN | OUT | CR | CW |
| BANK 7 | V2 | V4 | V6 | IN | OUT | CR | CW | V0 | V2 | V4 | V6 | IN | OUT | CR |
| BANK 8 | V1 | V3 | V5 | V7 | IN | OUT | CR | CW | V1 | V3 | V5 | V7 | IN | OUT |
| BANK 9 | CW | V1 | V3 | V5 | V7 | IN | OUT | CR | CW | V1 | V3 | V5 | V7 | IN |
| BANK 10 | CR | CW | V1 | V3 | V5 | V7 | IN | OUT | CR | CW | V1 | V3 | V5 | V7 |
| BANK 11 | OUT | CR | CW | V1 | V3 | V5 | V7 | IN | OUT | CR | CW | V1 | V3 | V5 |
| BANK 12 | IN | OUT | CR | CW | V1 | V3 | V5 | V7 | IN | OUT | CR | CW | V1 | V3 |
| BANK 13 | V7 | IN | OUT | CR | CW | V1 | V3 | V5 | V7 | IN | OUT | CR | CW | V1 |
| BANK 14 | V5 | V7 | IN | OUT | CR | CW | V1 | V3 | V5 | V7 | IN | OUT | CR | CW |
| BANK 15 | V3 | V5 | V7 | IN | OUT | CR | CW | V1 | V3 | V5 | V7 | IN | OUT | CR |

FIG. 7

| SLOT_CNT → | 0 | 1 | 2 | 3 | 4 | 5 | 6 | 7 | 0 | 1 | 2 | 3 | 4 | 5 |
|---|---|---|---|---|---|---|---|---|---|---|---|---|---|---|
| BANK 0 |  |  |  | IN |  |  |  |  |  |  |  | IN |  |  |
| BANK 1 |  |  |  |  | IN |  |  |  |  |  |  |  | IN |  |
| BANK 2 |  |  |  |  |  | IN |  |  |  |  |  |  |  |  |
| BANK 3 |  |  |  |  |  |  | IN |  |  |  |  |  |  |  |
| BANK 4 | IN |  |  |  |  |  |  | IN |  |  |  |  |  |  |
| BANK 5 |  | IN |  |  |  |  |  |  | IN |  |  |  |  |  |
| BANK 6 |  |  | IN |  |  |  |  |  |  | IN |  |  |  |  |
| BANK 7 |  |  |  | IN |  |  |  |  |  |  | IN |  |  |  |
| BANK 8 |  |  |  |  | IN |  |  |  |  |  |  | IN |  |  |
| BANK 9 |  |  |  |  |  | IN |  |  |  |  |  |  |  | IN |
| BANK 10 |  |  |  |  |  |  | IN |  |  |  |  |  |  |  |
| BANK 11 |  |  |  |  |  |  |  | IN |  |  |  |  |  |  |
| BANK 12 | IN |  |  |  |  |  |  |  | IN |  |  |  |  |  |
| BANK 13 |  | IN |  |  |  |  |  |  |  | IN |  |  |  |  |
| BANK 14 |  |  | IN |  |  |  |  |  |  |  | IN |  |  |  |
| BANK 15 |  |  |  | IN |  |  |  |  |  |  |  | IN |  |  |

FIG. 8A

PACKET PROCESSOR THAT GENERATES PACKET-START OFFSETS TO IMMEDIATELY STORE INCOMING STREAMED PACKETS USING PARALLEL, STAGGERED ROUND-ROBIN ARBITRATION TO INTERLEAVED BANKS OF MEMORY

RELATED APPLICATIONS

This application is a continuation-in-part (CIP) of the co-pending application for "Multi-threaded packet processing engine for stateful packet processing", U.S. Pub. No. 20050243734, U.S. Ser. No. 11/152,879, filed Jun. 14, 2005. This application is also related to "Multi-threaded packet processing engine for stateful packet processing", U.S. Pub. No. 20030069920, U.S. Ser. No. 10/254,377, filed Sep. 24, 2002.

FIELD OF THE INVENTION

This invention relates to multi-processor systems, and more particularly to interleaved packet-storage memories on packet processors.

BACKGROUND OF THE INVENTION

Continuing advances in semiconductor technology and increasing levels of integration have allowed multiple processor cores to be integrated together onto a single integrated-circuit chip. Some applications can be divided into separate, relatively independent tasks that can be assigned to different processor cores on a multi-processor chip. Such multi-threaded applications can especially benefit from the processing power of multiple processors.

One application that benefits from multi-processing is the processing of packets in a network. A network node may receive thousands of packets in a short period of time. Multiple processors may each be assigned individual packets to process, such as for security, encryption, routing, and other network functions. The amount of network traffic that can be processed can scale with the number of processors.

A multi-processor system may have hundreds or more processors on one or more chips that can operate somewhat independently of one another. However, the packets from the network must be sent to each assigned processor, such as by initially writing the incoming packets to a shared memory. Since all incoming packets must pass through this shared memory, the shared memory can become a system bottleneck.

While multi-ported memory cells could be used to increase the bandwidth of the shared memory, such multi-port memory cells are much larger and more expensive than standard single-port memory cells. Another approach is to divide the shared memory into several banks. Each bank may be accessed separately, allowing different processors to access different banks at the same time. For example, 4 banks could allow four processors simultaneous access, while 16 banks could allow 16 processors simultaneous access.

While each memory bank could have a separate range of addresses, interleaving addresses among all the banks is often preferable. In word interleaving, each bank stores one multi-byte word. A sequence of successive words are written to successive banks. Incoming packets appear as a stream of words in a sequence of increasing addresses, and can be written into the shared memory as successive multi-byte words that are written to successive banks of memory.

Since the incoming packets are written to successive banks, the writes are spread out across all banks so that no one bank is overloaded with writes. Other processors can access one bank when the incoming-packet writes are being made to another bank.

FIG. 1 shows packets that have been written into a word-interleaved shared memory. In this simple example, there are 4 banks and the words are 4 bytes. Packet 1 is stored starting at address 1000 Hex, and has its first 4 bytes 0:3 stored in bank 0. The next word of bytes 4:7 are stored in bank 1; bytes 8:B are stored in bank 2, and bytes C:F are stored in bank 3. Successive 4-byte words 10:13, 14:17, 18:1B, 1C:1F are stored in the next row of banks 0, 1, 2, 3 as shown. The last bytes in the packet are bytes 7FC:7FF which are stored in bank 3.

Packet 1 can be written into the shared memory as a stream of words that are successively written to the four banks, and then to successive rows, until all of the packet is written.

The shared memory may be divided into pages of 2K bytes per page. The start of each packet may be aligned to the 2K page boundaries. Thus all packets would start at a multiple of 2K bytes. Packet 1 starts at address 1000 Hex, packet 2 starts at address 1800, packet 3 starts at address 2000, and packet 4 starts at address 2800, etc.

Network packets can have varying sizes. While 2K bytes may be the maximum packet size, smaller packets are common. For example, packet 2 is 1K bytes, packet 3 is 32 bytes, and packet 4 is only 16 bytes. Packets could have other sizes that are not powers of two, such as 5 bytes, 27 bytes, etc. When one packet is assigned for each 2K page, there is often wasted space at the end of the page since most packets are smaller than 2K bytes.

Aligning packets to pages in memory can have an unintended consequence. Packets typically start headers, which contain important information such as the size of the packet, a network protocol used by the packet, and status or control information. A packet processor may examine these header fields more often than other parts of the packet such as the data payload.

For example, each of the processors that are assigned to process packets may need to read the size field (SIZ) from the packet headers. Although each processor reads a different packet stored in a different location in the shared memory, the accesses may tend to be to the same bank in the shared memory because the size field tends to be the same number of bytes from the start of each packet, when the same network protocols are used by different packets.

As shown in FIG. 1, size field SIZ occurs in bytes 0:3 of each of packets 1, 2, 3, 4. Four separate processors examining these packets may need to read the size fields, requiring access to bank 0. Although the packets are stored across all four banks, bank 0 is likely to have a higher access frequency since the size field is more frequently read than other bytes in the packets. This is undesirable.

FIG. 2 highlights a delay to begin writing a packet to a multi-bank memory with fixed round-robin arbitration. A simple approach to accessing multiple banks of the shared memory is to use a fixed round-robin arbitration scheme. For 8 banks and 8 requesters, each bank may allow each grantor to access the bank only once in 8 periods or time-slots. For example, the incoming-packet interface may be able to write to bank 0 only once every 8 time-slots. The bank that may be written by the incoming packet interface for each time-slot is shown at the bottom of FIG. 2. For the first time-slot, bank 0 may be written, then bank 1 for the second time-slot, then bank 2 for the third time-slot, etc.

When the start of packets must be aligned to the 2K pages as shown in FIG. 1, then the first word of a new incoming packet may only be written to bank 0. The first word of the packet may not be written to any of the other banks 1:7 since the packet would not be page-aligned. Thus the first word in the incoming packet must wait until it can be written to bank 0.

In the example shown in FIG. 2, incoming packet 1 is received when the packet interface is allowed to access bank 1. The next time-slot for bank 0 is 6 time-slots later. Thus the incoming-packet interface must wait for an additional 6 time-slot periods before the first word can be written to the memory at bank 0. This additional delay is undesirable. Additional buffers such as FIFOs may be needed to temporarily store incoming packets during this packet-start delay. As delays accumulate, these buffers may overflow, causing data loss and requiring packet re-transmission.

While words from packet 1 could be written to the shared memory in an out-of-order fashion, this is undesirable since the packet is received as a stream in ascending word order. Other packets may also be delayed, either due to the delay in starting the write of packet 1, or by a delay in writing the start of the new packet. Thus the delays may be cumulative. Also, as more banks of memory are added, the number of time-slots between accesses to bank 0 may also increase. Thus attempts to increase memory bandwidth by increasing the number of banks may increase packet-start delays.

What is desired is a multi-processor system with a shared memory that is divided into interleaved banks. It is desired to stream incoming packets into the shared memory using fixed round-robin arbitration, but without long packet-start delays. A high-bandwidth shared packet memory is desirable that has frequently-accessed fields in the packet headers spread across all banks is also desirable.

BRIEF DESCRIPTION OF THE DRAWINGS

FIG. 7 is a table of bank accesses by different ports over repeating cycles of time-slots.

FIGS. 8A-B show streaming of incoming packets to banks of memory using staggered, fixed-slot round-robin.

DETAILED DESCRIPTION

The present invention relates to an improvement in shared packet memory. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
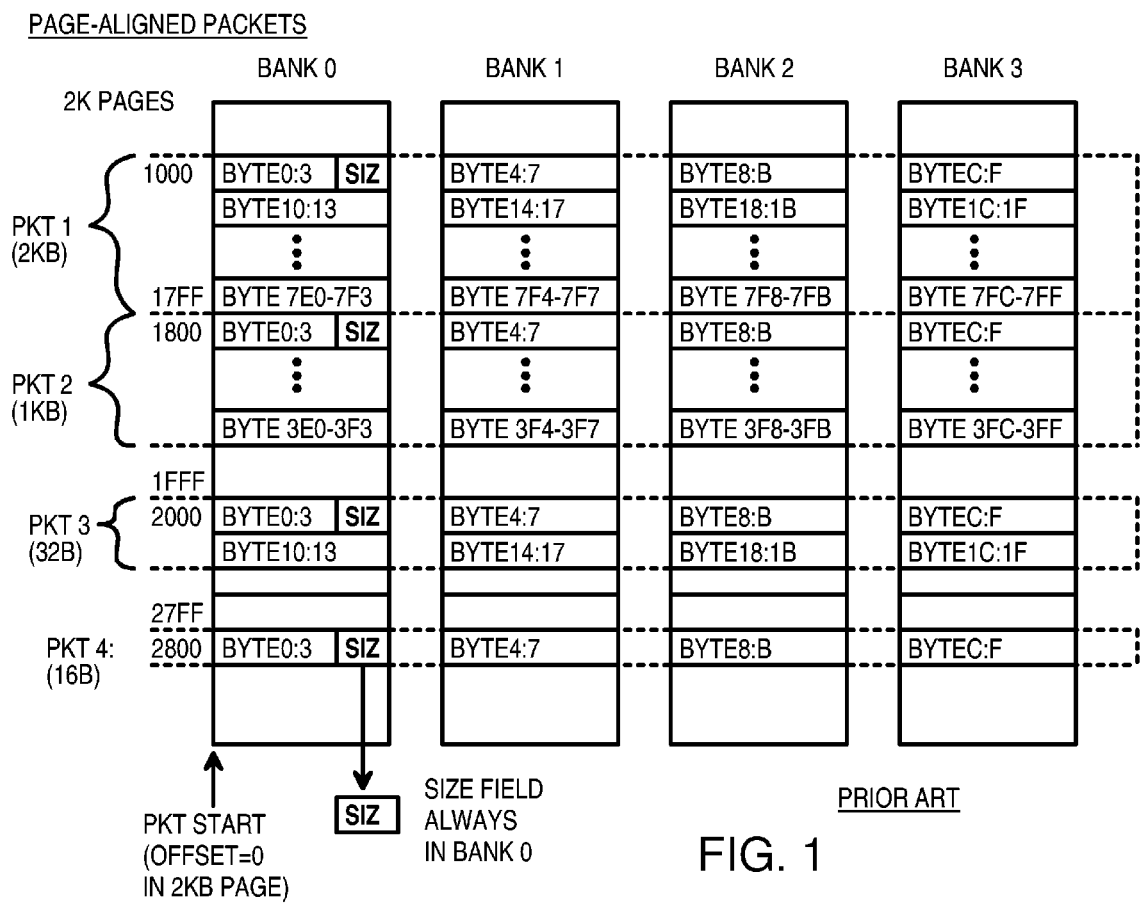
FIG. 1 shows packets that have been written into a word-interleaved shared memory.
Figure 2:
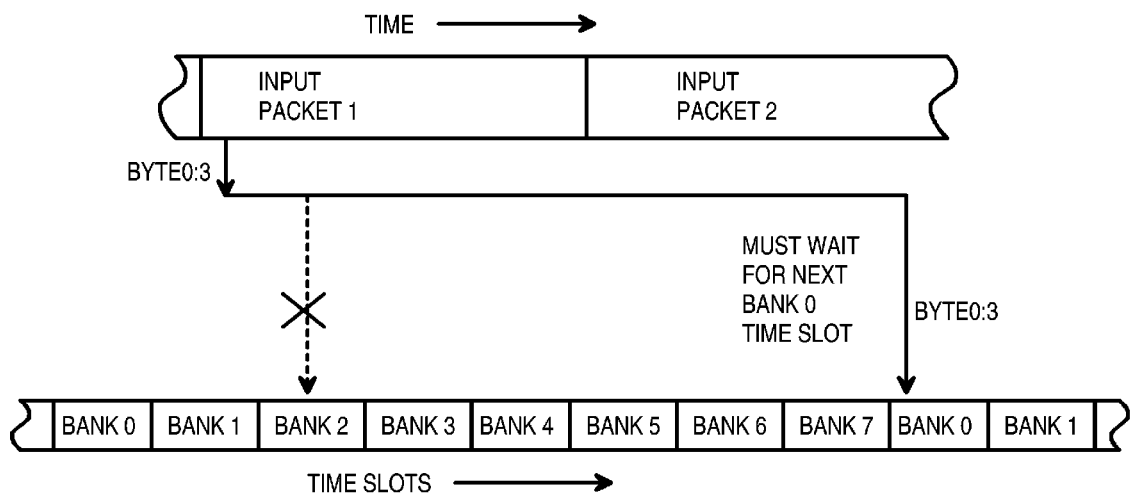
FIG. 2 highlights a delay to begin writing a packet to a multi-bank memory with fixed round-robin arbitration.

The inventors have realized that packet-start delays can be minimized or avoided by allowing the initial bytes of incoming packets to be written to any of the banks of memory. The first bytes of an incoming packet are written to the first bank available, avoiding the packet-start delay caused by waiting for bank 0 to become available, as shown in FIG. 2.

Since the start of the packet is not necessarily stored in bank 0, there is an offset from the page boundary to the first byte in the packet. This packet-start offset may not be immediately known, since the packet needs to be stored quickly to avoid a stall. Once the bank to receive the first bytes of the incoming packet is determined, a bank identifier for this bank is used to calculate an offset to this bank. The calculated offset becomes the packet's offset. Successive words of the incoming packet are written to successive banks in back-to-back cycles until the entire packet is written in. Thus the packet is streamed into the multi-bank shared memory without significant arbitration delays. Backpressure, stalls, and large FIFO buffers are avoided.

Figure 3:
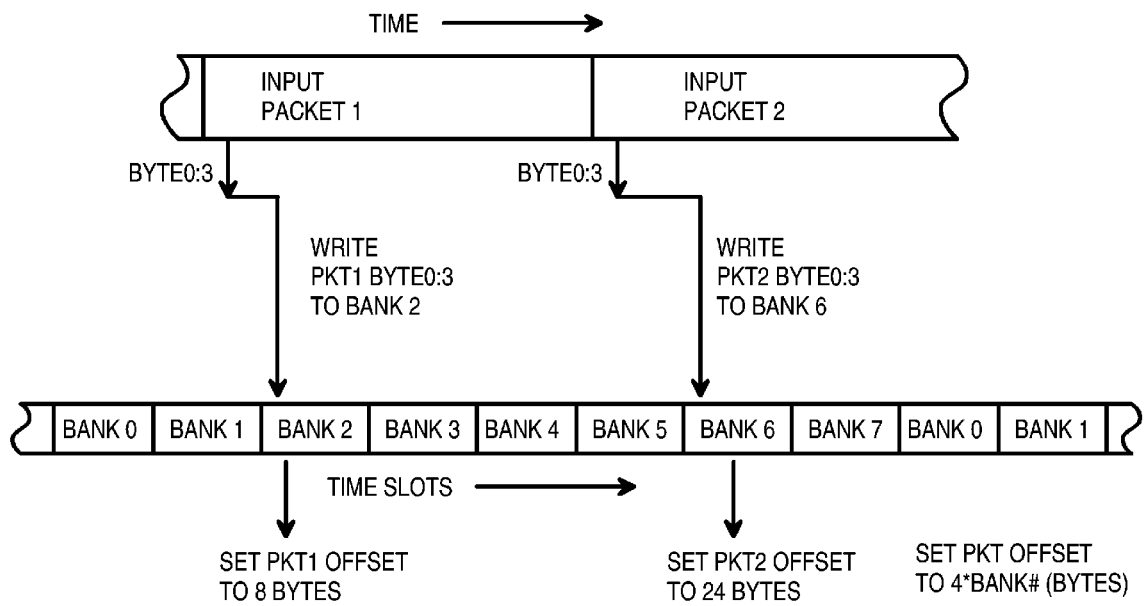
FIG. 3 highlights bank selection and offset generation when streaming-in an incoming packet to a multi-bank interleaved memory with fixed round-robin arbitration.

FIG. 3 highlights bank selection and offset generation when streaming-in an incoming packet to a multi-bank interleaved memory with fixed round-robin arbitration. Each of the 8 banks of word-interleaved memory allows the incoming-packet interface to write a word during a different one of the 8 times slots. Bank 0 may be written by the incoming packet interface just once every 8 time-slots. Banks 0, 1, 2, 3, . . . 6, 7 are each written during successive time-slots, allowing successive words in a packet to be written to successive banks of memory as a stream.

The first bytes of packet 1 are received and are ready to be written to memory during the time-slot for bank 2. The first 4 bytes 0:3 are immediately written to bank 2. The next 4 bytes 4:7 are written to bank 3 during the next time-slot, while the following bytes 8:B are written to bank 4 in the following time-slot. Successive 4-byte words are written to successive banks during successive time-slots until all bytes in packet 1 have been written.

Packet 2 may follow packet 1 in a data stream with little or no delay between packets. Packet 2 is ready to write its first word during the time-slot for bank 6. Thus packet 2 begins at bank 6, and continues with banks 7, 8, 0 in the next 3 time-slots.

A fixed round-robin arbiter allows for rapid determination of the bank to receive the initial bytes of the packet. The bank number for the first word in a packet is known as the packet begins to be written to the memory, or perhaps just before. The offset is generated from this bank number. The offset can be stored in a descriptor or in a message that contains a full address with this offset.

The offset in bytes is calculated as the bank number multiplied by bank granularity, which can be the same as the word width. For example, packet 1 is first written into bank 2, and the bank granularity is 4 bytes, so the offset for packet 1 is calculated as 2*4 bytes, or 8. Packet 2 is written starting at bank 6, so the offset generated or packet 2 is 24.

Figure 4:
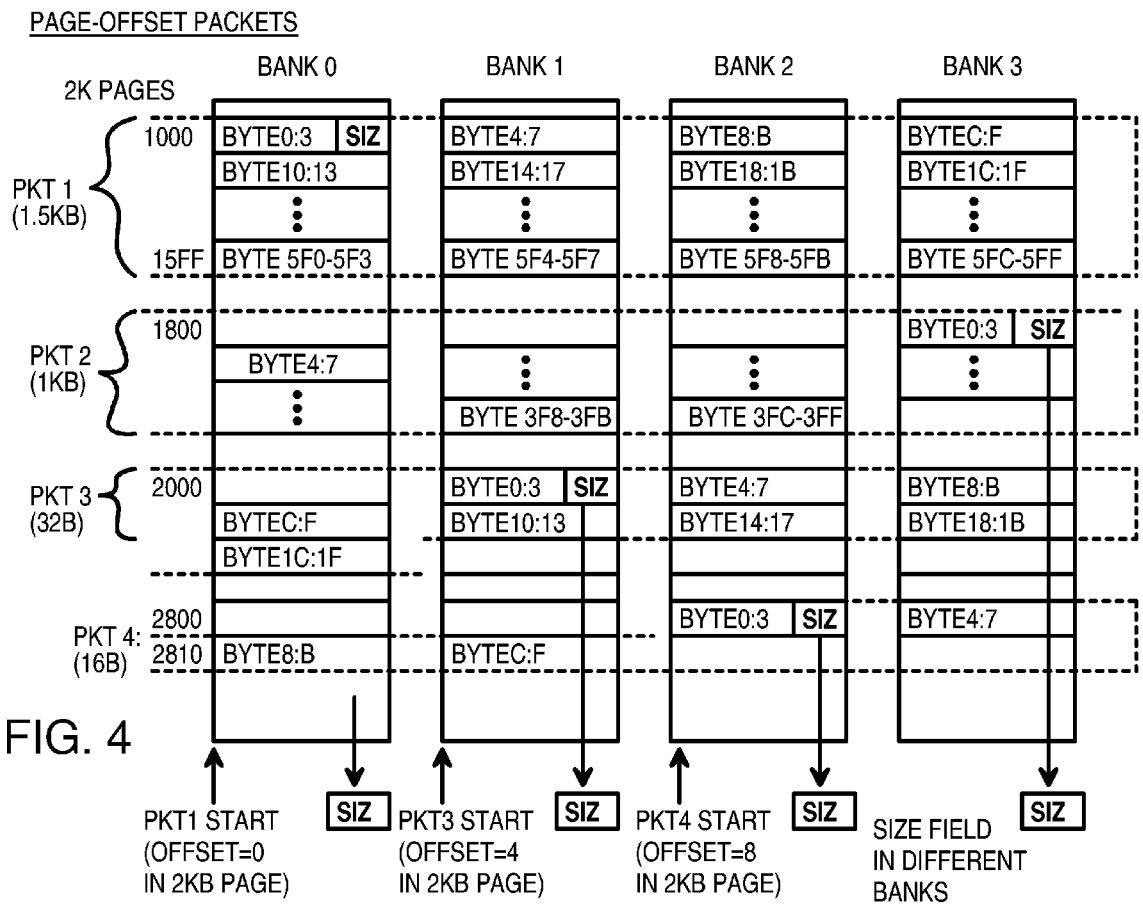
FIG. 4 highlights packets with varying page offsets, which spread frequently-accessed fields in packets headers among several banks.

FIG. 4 highlights packets with varying page offsets, which spread frequently-accessed fields in packets headers among several banks. Packet 1, a 1.5K-byte packet, has a 0 offset and has its size field stored in bank 0. Other packets have non-zero offsets, causing their size fields to be stored in other banks. Spreading the storage of more-frequently-accessed fields onto several banks improves performance since memory-access loading is not over-weighted on one single bank.

Packet 2 has its first bytes stored in bank 3, and has an offset of 12 bytes (C hex). Since packet 2 has a size of 1K bytes, its final byte 3FF is stored in bank 2. The remainder of the 2K page from 1C00-1FFF is unused, as are the first 3 words (bytes 1800-180B) of the page before the packet start.

Packet 3 is a 32-byte packet with the first bytes stored in bank 1. The offset for packet 3 is 4 bytes. Packet 4 is only 16 bytes long, with its first 4 bytes stored in bank 2. The offset for packet 4 is 8 bytes.

In the example of FIG. 4, each of the four packets begins in a different bank. Since the starting bytes of these incoming packets were stored to different banks of memory, the packet offsets vary from packet to packet. This causes the packet-size fields SIZ to be stored in different banks.

The offset for a packet depends on when the packet arrives, which may depend on the size and timing of previous packets in the stream of packets. The varying offsets have a beneficial effect of spreading out accesses to the banks during subsequent packet processing by the multiple processors.

Figure 5:
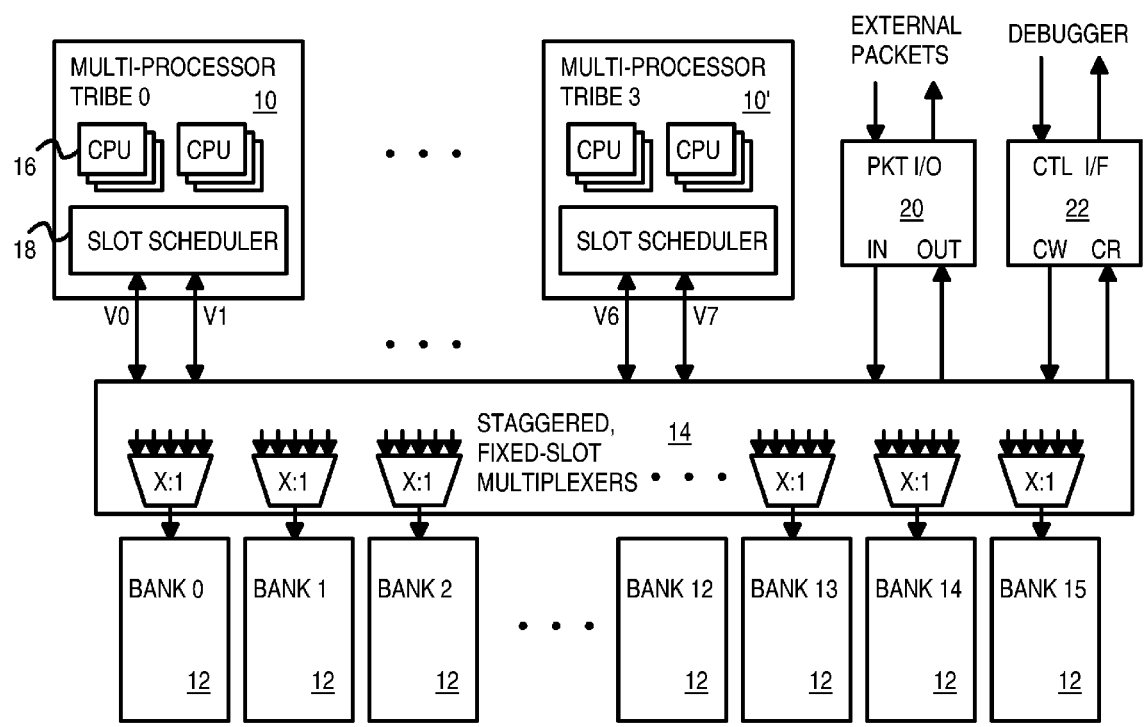
FIG. 5 shows parallel access of a multi-bank memory in a packet-processor system.

FIG. 5 shows parallel access of a multi-bank memory in a packet-processor system. An internal memory is organized into 16 banks 12 that are word interleaved. Banks 12 are accessed by processors 16 that operate on packets stored in banks 12 and perform packet processing. Processors 16 are central processing units (CPU) that execute code. Each of processors 16 could operate on a different packet stored in banks 12.

Processors 16 are arranged into clusters or groups known as multi-processor tribes 10, 10'. A system may have 2, 4, or more multi-processor tribes 10,10'. Multi-processor tribes 10 contain 48 processors 16 in one embodiment, allowing many packets to be simultaneously operated upon by separate threads running on separate ones of processors 16. A high throughput of packets can thus be achieved.

Slot scheduler 18 receives up to 48 requests from the 48 processors 16 on multi-processor tribes 10. Slot scheduler 18 prioritizes the processor requests and schedules the requests to match with the banks that can be accessed in any cycle. The details of slot scheduler 18 are shown later in FIG. 12. The result is that slot scheduler 18 produces a stream of accesses to banks 12 from the many processors 16 in multi-processor tribes 10 despite the random nature of requests from the many processors 16.

Packets from an external network are received by packet interface 20. Incoming packets are written into banks 12 by packet interface 20 over input port IN. Once processors 16 have finished processing packets, the packets are read from banks 12 by packet interface 20 through output port OUT and are sent out over the external network.

Control interface 22 may also read and write data in banks 12 using its read and write ports CR, CW. Control interface 22 may be used for a variety of purposes, such as debugging, initialization, testing, other host processor functions, control-plane functions, etc. Often large blocks of data are read or written by control interface 22 as streams of data.

Each of banks 12 may be accessed in parallel, allowing 16 simultaneous accesses for the 16 banks. This provides a large bandwidth of 16 words, or 64 bytes per cycle. Each multi-processor tribes 10, 10' has two ports that can access banks 12 simultaneously for read or write access. These processor ports are labeled v0, v1 for multi-processor tribes 10, v6, v7 for fourth multi-processor tribes 110', etc. A total of 12 ports are provided with four multi-processor tribes 10, 10 and packet interface 20 and control interface 22.

A fixed round-robin arbitrator is provided to allow each of the ports to access one bank in any cycle. Staggered, fixed-slot multiplexers 14 have one X:1 multiplexer for each bank. Each mux selects a port for access in the current cycle. For example, 12:1 muxes could be used, with one mux for each of banks 12, for a total of 16 muxes.

Figure 6A:
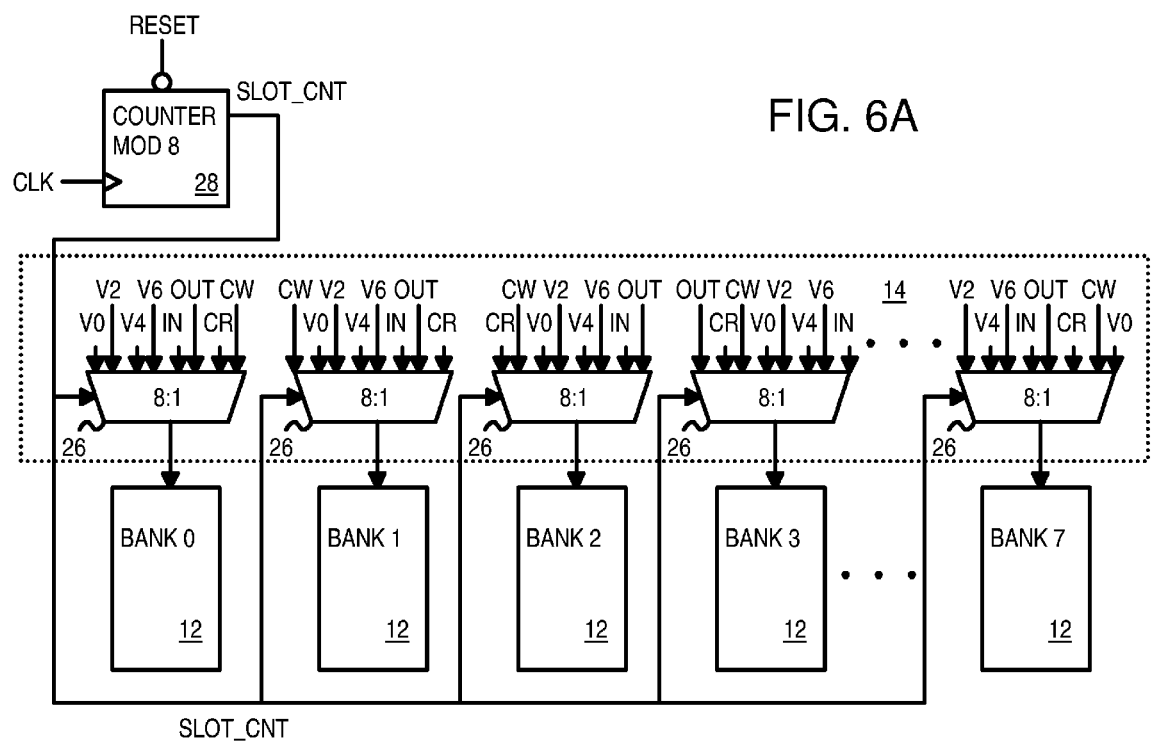
FIGS. 6A-B show details of staggered, fixed-slot multiplexers for fixed round-robin arbitration to banks of shared memory.
Figure 6B:
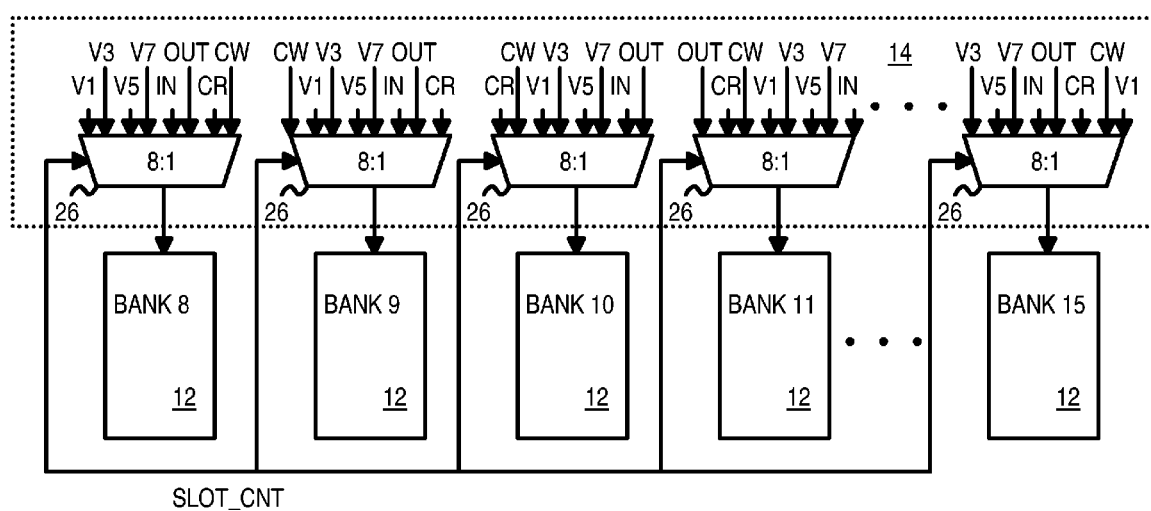

FIGS. 6A-B show details of staggered, fixed-slot multi-plexers for fixed round-robin arbitration to banks of shared memory. Rather than use 12:1 muxes for staggered, fixed-slot multiplexers 14, less-complex 8:1 muxes are used in the embodiment shown in this figure. Since each of multi-processor tribes 10, 110' has two ports, the ports are restricted to a subset of banks 12. The even ports v0, v2, v4, v6 may only access banks 0-7 (FIG. 6A), while odd ports v1, v3, v5, v7 may only access banks 8-15 (FIG. 6B).

Even ports v0, v2, v4, v6 are applied as inputs to muxes 26 for lower banks 0-7, while odd ports v1, v3, v5, v7 are applied as inputs to muxes 26 for upper banks 8-15. Each of the 16 muxes 26 for all 16 banks receive the packet input and output ports IN, OUT for packet interface 20, and the control read and write ports CR, CW for control interface 22.

Modulo-8 counter 28 increments for each memory-access cycle, outputting a current slot-count value SLOT_CNT. Muxes 26 receive SLOT_CNT as the control (select) input that determines which of the 8 input ports are selected to access the memory bank. In FIGS. 6A-B, the inputs to muxes 26 are selected for control values of 0, 1, 2, 3, . . . 6, 7 from left to right.

For example, when SLOT_CNT is 0, v0 is selected for bank 0, CW for bank 1, CR for bank 2, OUT for bank 3, and IN, V6, V4, V2 for banks 4, 5, 6, 7, respectively. When SLOT_CNT is 1, v2 is selected for bank 0, v0 for bank 1, OUT, IN, V6, V4, for banks 4, 5, 6, 7, respectively. When SLOT_CNT is 7, CW is selected for bank 0, CR for bank 1, V0 for bank 7, etc.

The assignment of ports to the inputs of muxes 26 is staggered in a rotating order. For example, port v0 is applied to input 0 of mux 26 for bank 0, input 1 of mux 26 for bank 1, input 2 of mux 26 for bank 2, input 3 of mux 26 for bank 3, . . . , and input 7 of mux 26 for bank 7.

As modulo-8 counter 28 and SLOT_CNT are incremented, port v0 can access successive banks, from bank 0, bank 1, bank 2, . . . until bank 7 in the 8th cycle when SLOT_CNT=7. Incoming packets on port IN can be written to successive banks over 16 successive cycles before repeating with the first bank written.

FIG. 7 is a table of bank accesses by different ports over repeating cycles of time-slots. The time-slots are incremented as time progresses to the right in the table. Modulo-8 counter 28 (FIG. 6A) counts from 0 up to 7, and then resets to 0 and repeats counting up.

During each time slot, all 16 banks of memory may be simultaneously accessed. For example, in time-slot 0, bank 0 is accessed by port v0, bank 1 is accessed by port CW, bank 2 is accessed by port CR, bank 3 is accessed by port OUT, . . . bank 14 is accessed by port v5, and bank 15 is accessed by port v3, as shown in the first column in the table. In the next in time-slot 1, bank 0 is accessed by port v2, bank 1 is accessed by port v0, bank 2 is accessed by port CW, bank 3 is accessed by port CR, . . . bank 14 is accessed by port v7, and bank 15 is accessed by port v5, as shown in the second column in the table.

The even processor ports v0, v2, v4, v6 may only access banks 0-7, while the odd ports v1, v3, v5, v7 may only access banks 8-15. During any time-slot, ports IN, OUT, CR, CW may access either of 2 banks. For example, in time-slot 4, incoming packets may be written to either bank 0 or bank 8 through port IN.

Figure 8B:
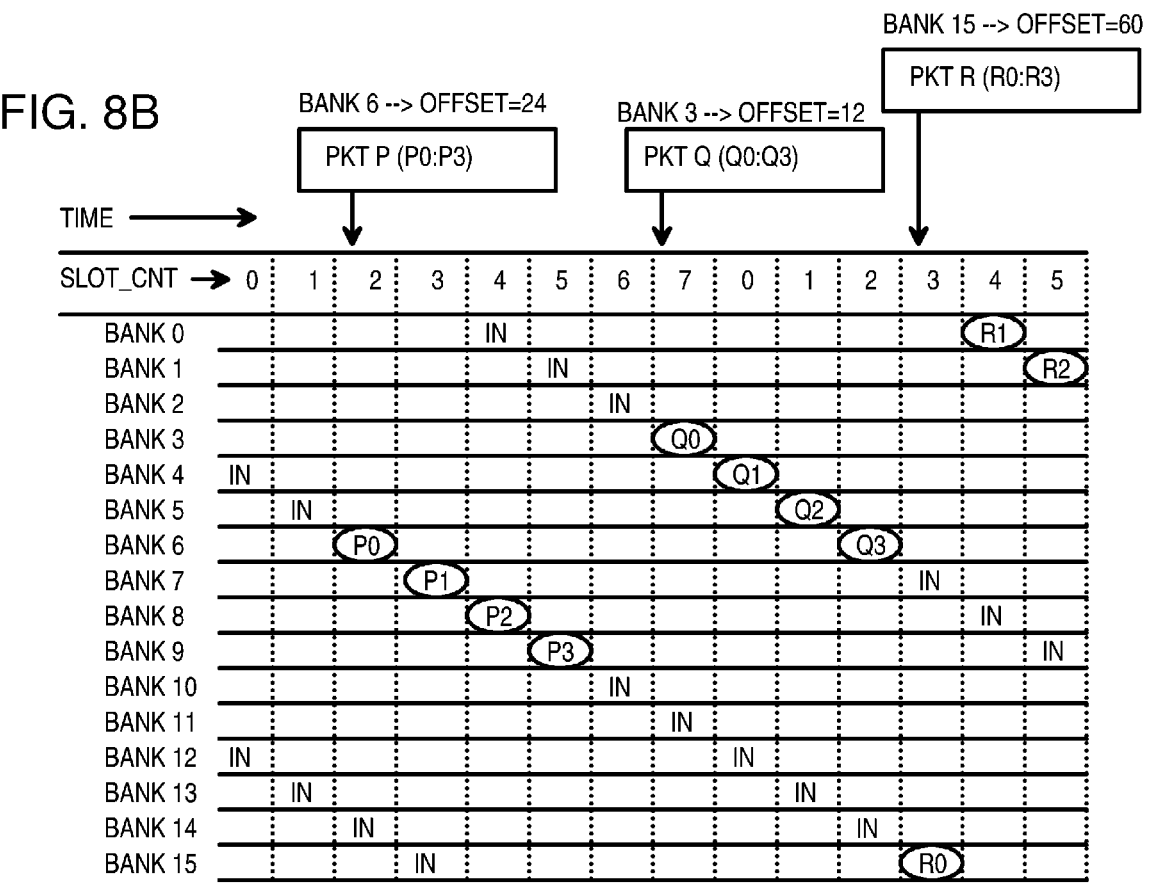

FIGS. 8A-B show streaming of incoming packets to banks of memory using staggered, fixed-slot round-robin. FIG. 8A shows that port IN may access successive banks over successive time-slots. A stream of bytes may be written to banks 4, 5, 6, . . . 14, 15 over 10 cycles during time-slots 0-7 and 0-3.

Being able to stream-in data is especially useful for writing and reading packets, since packets are usually sent over an external network as streams of bytes. In FIG. 8B, packets P, Q, R are received by packet interface 20 and written into memory of banks 12. The first bytes of packet P are received and ready to be written to the banks during time-slot 2. Incoming-packet port IN can access bank 6 during time-slot 2, so these first bytes (word P0) of packet P are written to bank 6. Other words P2, P3, P4 of packet P are received and written to banks 7, 8, 9, during time-slots 3, 4, 5, respectively.

Since the first bank written by packet P is bank 6, the offset for packet P is calculated as 6 times the bank granularity, or 6*4, which is 24 bytes. The page offset for packet P is thus 18 Hex.

A second packet Q is ready to be written during time-slot 7. The first word Q0 of packet Q could be written to either bank 3 or bank 11. If bank 3 is chosen, then the page offset for packet Q is 3*4, or 12 bytes. Successive words Q1, Q2, Q3 of packet Q are written during time-slots 0, 1, 2 to banks 4, 5, 6, respectively.

A third packet R is ready to be written during time-slot 3. The first word R0 of packet R could be written to either bank 7 or bank 15. If bank 15 is chosen, then the page offset for packet R is 15*4, or 60 bytes. Words R0, R1, R2 of packet R are written during time-slots 3, 4, 5 to banks 15, 0, 1, respectively.

Packets that are received as streams of data can be efficiently written to the interleaved banks of shared memory using the fixed round-robin arbitration. Determining the packet's offset from the first bank written allows packet-writing to begin without unnecessary delays.

Figure 9:
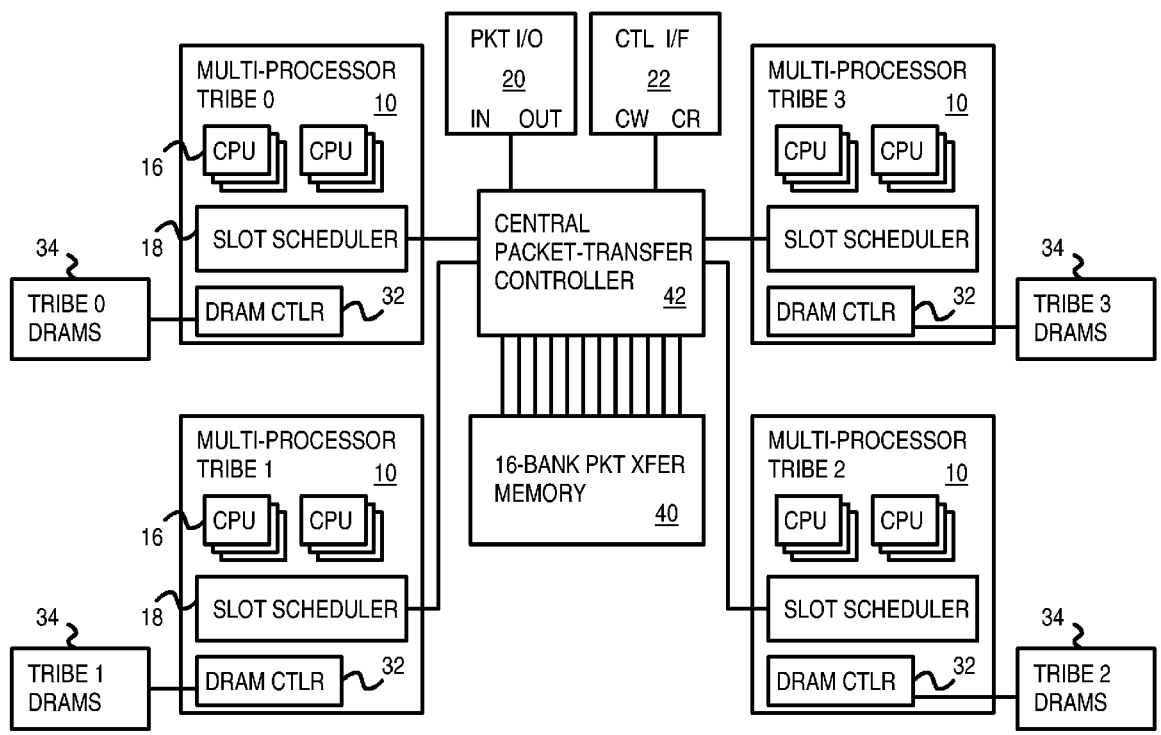
FIG. 9 is a block diagram of a packet processor.

FIG. 9 is a block diagram of a packet processor. Packet-transfer memory 40 contains 16 banks of interleaved memory and stores incoming and outgoing packets from packet interface 20. Control interface 22 may also read and write data streams in packet-transfer memory 40.

Four multi-processor tribes 10 each have 48 processors 16 that access packets and scratch-pad data in packet-transfer memory 40 using slot scheduler 18 that schedules processor requests to fit into the allowed bank accesses of FIG. 7. Processors 16 may also access local memory 34 through memory controller 32. Local memory 34 may be external DRAM or other kinds of memory for use by each of multi-processor tribes 10.

Central packet-transfer controller 42 receives access requests from multi-processor tribes 10, packet interface 20, and control interface 22 and arbitrates memory access to packet-transfer memory 40 using a fixed round-robin scheme as described earlier for FIGS. 5-8. Other control functions such as ordering packets and control transfers to and from processors 16 may be handled by central packet-transfer controller 42 or by other logic not shown.

Figure 10:
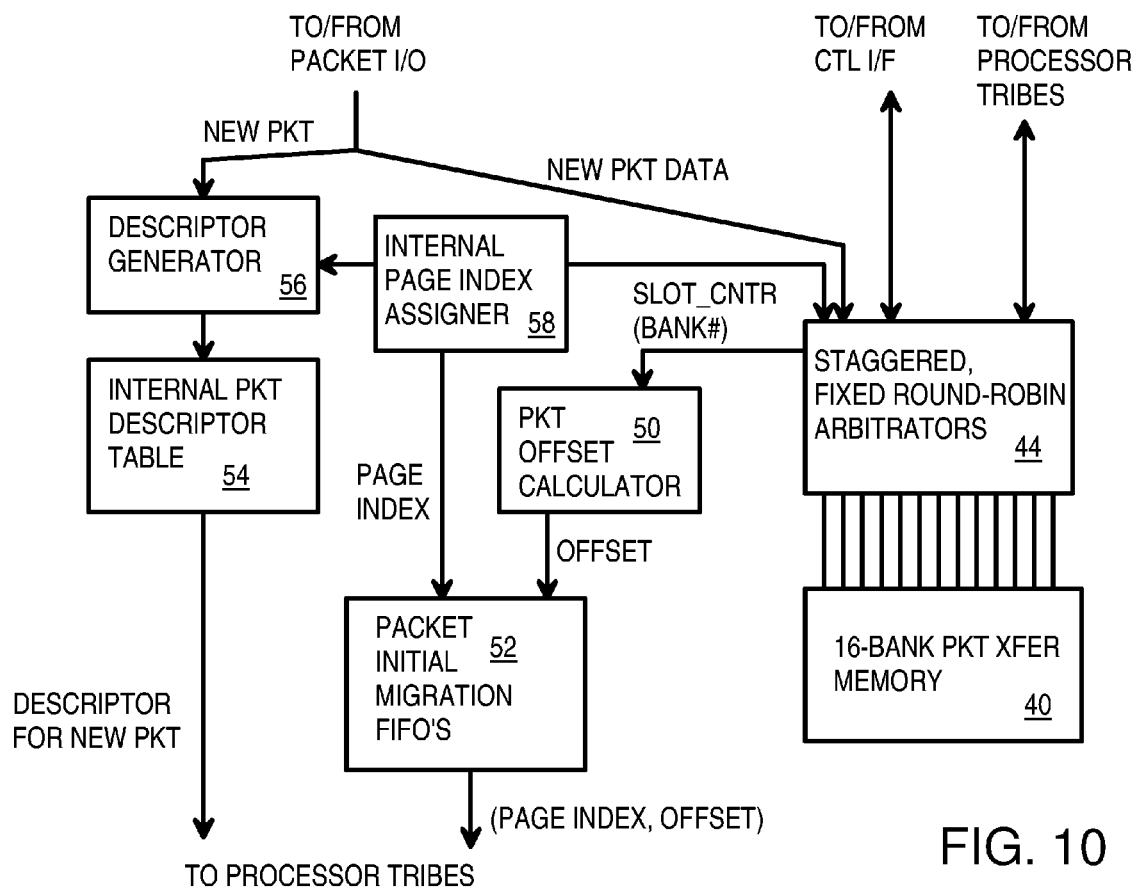
FIG. 10 shows generation of packet offsets and internal descriptors when new packets are written into the shared memory.

FIG. 10 shows generation of packet offsets and internal descriptors when new packets are written into the shared memory. The multiple banks of packet-transfer memory 40 are accessed in a fixed round-robin pattern through staggered round-robin arbiters 44 as described earlier.

Packet-transfer memory 40 is most efficiently accessed by streaming accesses. Random accesses from processors in multi-processor tribes are combined to form an access stream by slot schedulers (FIG. 12), while data accesses from control interface 22 are likely to be in a stream format. Packets received by packet interface 20 are also in a stream format.

Header and data payloads from incoming packets are written into packet-transfer memory 40 as a data stream. A slot counter indicates a current bank to be written to by incoming packet port IN. Packet offset calculator 50 receives the current slot count and determines the page offset for a new packet. Packet offset calculator 50 encodes the slot-vs.-bank information of FIG. 8A, so that the bank number can be determined from the current slot count and selection of upper or lower banks. The packet's offset is then generated as the bank granularity multiplied by the bank number.

Internal page assigner 58 determines which page in packet-transfer memory 40 to write a new incoming packet to. For example, packet-transfer memory 40 may have 512K bytes assigned, and use 2K pages, so that there are 256 possible pages. The page index can be an 8-bit value. One of the available pages is selected by internal page assigner 58. A list of available pages may be kept and updated by internal page assigner 58.

The page index for the page selected by internal page assigner 58 to write the incoming packet to is sent to packet-transfer memory 40 and to initial migration FIFOs 52. Initial migration FIFOs 52 stores the full address of the start of a packet, both the page index from internal page assigner 58 and the packet's offset generated by packet offset calculator 50. Initial migration refers to passing control to an assigned processor in multi-processor tribes 10 after the incoming packet has been stored in packet-transfer memory 40. Initial packet migration causes the assigned processor to begin executing instructions to processing the packet.

Descriptors are used for each packet in the packet processor. These descriptors are used internally and are not part of the packet itself or the packet's network-protocol header. Descriptors include the page index from internal page assigner 58, which points to the packet's location in packet-transfer memory 40, the size of the packet, and other information such as processing status.

Descriptor generator 56 generates a new descriptor when a new incoming packet is received and stored into packet-transfer memory 40. This descriptor is written to internal packet descriptor table 54, which is a table of internal descriptors. During initial migration, pointers to a descriptor in internal packet descriptor table 54 are sent to the assigned processor in multi-processor tribes 10, along with the full address (page index and offset) from initial migration FIFOs 52.

Figure 11A:
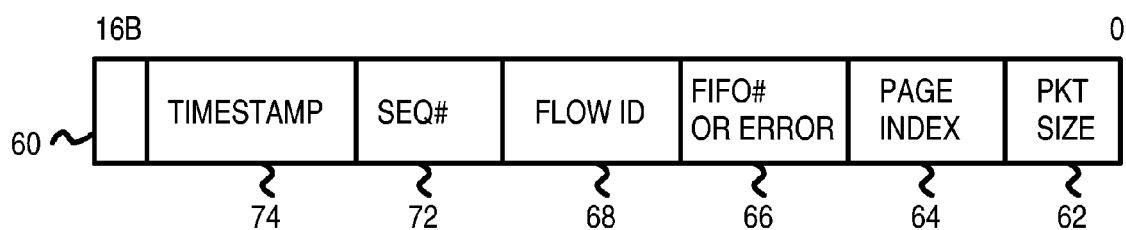
FIGS. 11A-B show formats of internally-used descriptors.
Figure 11B:
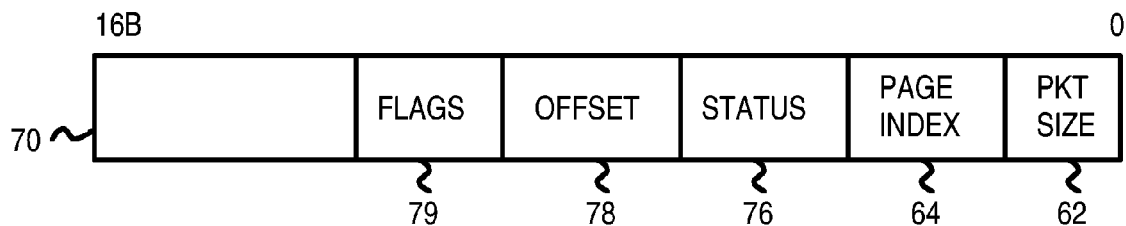

FIGS. 11A-B show formats of internally-used descriptors. In FIG. 11A, a descriptor for an incoming packet is shown. Internal descriptors are 16 bytes in length and are generated when a new incoming packet is received to instruct an assigned processor in the multi-processor tribes to begin executing instructions to process the packet.

Ingress descriptor 60 includes timestamp 74, which may be a network timestamp, such as when the packet was received from the external network. Alternately, timestamp 74 could be an internal time when the incoming packet was received or stored into the internal memory, or a time that the assigned processor was instructed to begin processing the packet, or some other timed event.

Sequence number 72 indicates when ingress descriptor 60 is for a packet that is in a sequence of packets, such as a flow or stream of packets. For example, a large packet could have been divided into smaller packets that are ordered by sequence number 72, or a video stream may use sequence numbers to order packets such as datagrams. Sequence number 72 may be an internally-generated number that indicates the ordering of packets. The sequence number may be used to locate the descriptor in internal packet descriptor table 54 in some embodiments.

Flow ID field 68 contains a flow identifier extracted from the packet header. The flow ID indicates that a packet belongs to a particular flow of packets, such as a stream of many audio packets for a Voice-over-Internet-Protocol (VoIP) telephone call that share the same flow ID. FIFO/error field 66 contains an identifier that identifies an entry or a FIFO buffer in initial migration FIFOs 52 and/or for internal packet descriptor table 54, which may be arranged as several FIFO buffers. When an error occurs, an error code is inserted into FIFO/error field 66. Errors may include packets larger than 2K bytes, unexpected start or end of packets, etc.

Page index 64 contains the page index that the incoming packet was written to. The index may be an 8-bit value when there are 256 possible pages, or a 9-bit value when there are 512 possible pages to write packets to. Other values are possible.

Packet size 62 indicates the size of the incoming packet. Packet size 62 may be encoded or may be a size in bytes, words, or some other granularity. Packet size 62 may be extracted from the incoming packet's header, or may be internally generated.

In FIG. 11B, a descriptor for an outgoing (egress) packet is shown. After the assigned processor (or another processor) has finished processing the packet, central packet-transfer controller 42 (FIG. 9) is notified that the packet is ready to be sent out to the external network through packet interface 20. The assigned processor modifies ingress descriptor 60 by writing updated values to generate egress descriptor 70. Writing of the descriptor can be used to signal that the assigned processor has completed processing.

Egress descriptor 70 includes flags 79 that indicate various conditions. For example, a flag may indicate that the egress packet is stored in local memory 34 (external DRAM) or in packet-transfer memory 40 (internal SRAM). Another flag may be used to indicate that a valid offset is present in offset field 78.

Offset field 78 contains an offset to the start of the packet within the 2K page. The assigned processor may have copied the packet to a new location, so the offset for the egress packet may not be the same offset as for the incoming packet.

Status field 76 contains status bits. A status bit may be set when the assigned processor has finished processing the packet, or to indicate that the memory space for the egress packet may be allocated to another packet, or must remain un-allocated so that the assigned processor can use it again, such as for multi-cast packets. Interrupt status or flag bits may also be used.

Page index 64 contains the page index that the outgoing packet was written to. The index may be an 8-bit value when there are 256 possible pages, or a 9-bit value when there are 512 possible pages to write packets to. Packet size 62 indicates the size of the outgoing packet. Packet size 62 may be encoded or may be a size in bytes, words, or some other granularity.

While the packet's page offset is stored in egress descriptor 70, the offset is not stored in ingress descriptor 60 since the offset is passed to the assigned processor during initial migration with the full address. Other embodiments may include the offset in ingress descriptor 60 rather than pass the full address during initial migration.

Figure 12:
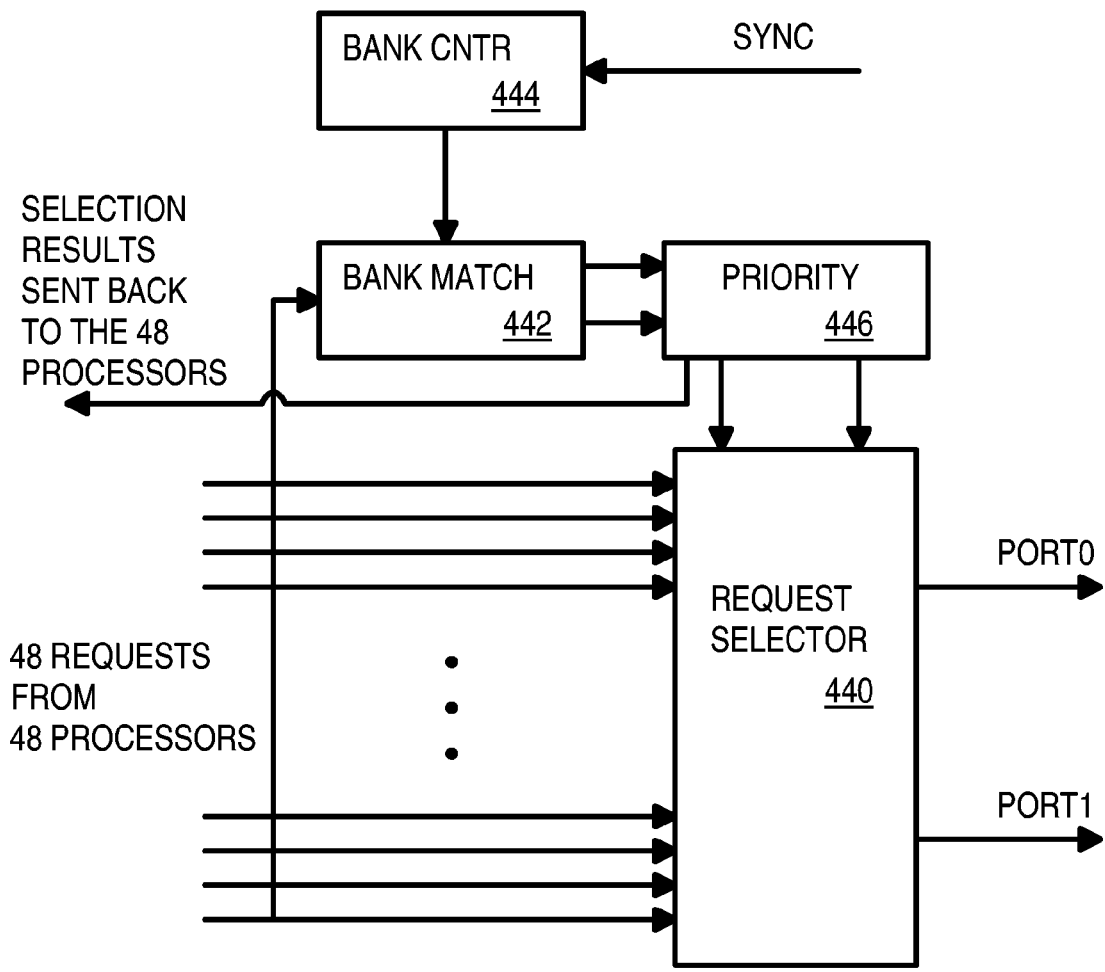
FIG. 12 is a block diagram of the slot scheduler in a multi-processor tribe.

FIG. 12 is a block diagram of the slot scheduler in a multi-processor tribe. Slot scheduler 18 receives memory-access requests from processors in the tribe. Each processor may send one request per cycle. However, only one request may be outstanding per processor in one embodiment, so up to 48 requests may be pending in a tribe. Since each processor is operating on a different packet, these requests are not related to one another and appear as randomly-addressed requests rather than a stream or sequential addresses.

Slot scheduler 18 receives these random requests and generates two streams of requests to packet-transfer memory 40. The first stream of requests is sent via port 0 and the second stream is sent via port 1. The streams of requests generated are synchronized to fixed round-robin arbiter 44. In each memory cycle, slot scheduler 18 selects up to two requests for the banks that can be accessed in that cycle, as shown in the table of FIG. 7 (from the point of view of the packet-transfer memory 40, port 0 of tribe 0 is v0, port 1 of tribe 0 is v1, port 0 of tribe 1 is v2, etc.). Other non-selected requests carry over to the next cycle. Some requests may have to wait many cycles before being selected.

Each slot scheduler 18 has two ports to access packet-transfer memory 40, an odd port 1 and an even port 0. For example, the first multi-processor tribe 10 has ports v0, v1, while the fourth multi-processor tribe 110' has ports v6, v7. The even port can only access banks 0-7, while the odd port can only access banks 8-15.

For example, when requests for access to banks 0, 2, 3, 4, 7, 11, 12, 13, and 15 are received, and banks selection for time-slot 3 is being made for the tribe with ports v0, v1, then bank 3 can be accessed via port 0, and bank 11 can be accessed via port 1. The request for bank 3 is selected for port 0, and the request for bank 11 is selected for port 1. The other requests to banks 0, 2, 4, 7, 12, 13, and 15 remain pending into the next cycle.

During the next time-slot 4, banks 4, 12 can be accessed and their requests are selected. For time-slot 5, banks 5, 13 can be accessed. Since there is no request for bank 5 pending, no request is sent over port 0. The request to bank 13 is sent over port 1. The other requests to banks 0, 2, 7, and 15 remain pending into the next cycle. After 8 cycles, all banks may be accessed.

Bank counter 444 is a mod-8 counter that keeps track of the current banks that can be accessed for the current time-slot being processed. A synchronization signal is received from modulo-8 counter 28 (FIG. 6A) periodically, such as each time counter 28 wraps around to 000. This synchronization signal may be pipelined, delayed, advanced, or otherwise time-adjusted to account for pipeline delays between slot scheduler 18 and round-robin arbiter 44.

Since two banks may be accessed each cycle, bank counter 444 points to two banks: one bank in lower banks 0-7, and another bank in upper banks 8-15. The 3-bit count from bank counter 444 can be the lower 3 bits of a pair of 4-bit bank identifiers that have the most-significant-bit (MSB) set to 1 and 0 to point to upper and lower banks.

Bank match 442 examines the pending requests from the 48 processors and selects only those requests that have a bank identifier that matches the pair of 4-bit bank identifiers. The bank identifiers can be bits 2:5 of a request address when the banks have 4-byte granularity, since address bits 0:1 are for the byte within the bank.

Requests that match either of the pair of bank identifiers from bank counter 444 are selected by bank match 442 and passed on to prioritizer 446. Prioritizer 446 selects one request matching the selected lower bank for even port 0, and selects one request matching the selected upper bank for odd port 1. For example, requests to bank 1 and bank 9 may be selected in one cycle, and requests to bank 2 and bank 10 in the next cycle. Non-selected requests roll over to future cycles and remain pending. Prioritizer 446 sends the selection results to request selector 440, which multiplexes the selected requests to the proper ports. Prioritizer 446 also signals the 48 processors with the selection results. The two processors with their requests selected proceed to send the next requests, if any exist. Of course, other embodiments may be substituted for the embodiment of FIG. 12.

Various fairness schemes may be implemented by prioritizer 446. For example, prioritizer 446 may use a 6-bit priority pointer and a direction bit. The priority pointer indicates which of the 48 requests has the highest priority. The direction bit indicates the direction of prioritization. For example, when the pointer points to request 4, and the direction bit is 0, then the order of prioritization from highest to lowest is 4, 5, 6, 7, 8 . . . 47, 0, 1, 2, 3. If the direction bit is 1, the order is reversed: 4, 3, 2, 1, 0, 47, . . . 8, 7, 6, 5. If a request is not present or valid, a request with a lower priority is considered. The priority pointer is advanced to the next priority value only when the stream request with the highest priority is selected or when this request is not valid. The pointer is advanced from 0 to 47 then wraps back to 0. When the pointer wraps around, the direction bit is toggled. This mechanism prevents starvation and guarantees a worst-case latency. Many variations are possible.

Slot scheduler 18 produces two streams of requests that are in the proper sequence to the banks of packet-transfer memory 40. The random requests from the many processors in multi-processor tribes 10 are converted into the streams of requests that each appear to be a stream from a single sequential source, such as a packet interface. Thus the random processor requests are converted to packet-like streams. Since packet-transfer memory 40 is optimized for stream access, very high memory bandwidth can be achieved despite the random requests from the processors.

Alternate Embodiments

Several other embodiments are contemplated by the inventors. For example different page sizes, bank granularities, word widths, and memory sizes may be substituted. Words do not have to be restricted to 4 bytes, but could have other values such as 8 bytes, 56 bits, and include parity or error-correction bits as well as data bits. The bank granularity has been described as matching the word size, but this is not required. For example, the bank granularity may be a multiple of the data path width to the memory. Multiple bus cycles could occur for each time-slot or for each memory cycle.

While the maximum packet size has been described as 2K bytes, the maximum packet size may be smaller when there is a non-zero offset to the packet. There may be empty space at the start of the page, before the start of the packet at the offset. This empty space reduces the maximum possible size of the offset packet. Thus the maximum page size is actually 2K (the page size) minus the offset. There may be other storage within the 2K page that is not used by the packet itself, such as stack variables or other variables related to the packet stored in that 2K page. Thus the maximum packet size may be further reduced by the space reserved for these variables.

While the size field in packet headers has been shown as an example of a frequently-accessed field, this field may occur in bytes other than the first four bytes in a packet. Other fields in a packet may be more frequently accessed, such as a protocol field, and different mixes of packet types may exhibit different access statistics. Sequence number 72 may be extracted from the header of the incoming packet, or may be an internally-generated number or some combination.

Various blocks may be pipelined, and operate at different times on the same data due to pipeline delays. Reference to a certain time-slot may refer to different physical times for the memory cells, address decode logic, data latches, arbiters, muxes, slot schedulers, and request generation in the processors. Additional blocks, logic, and functions may be added in various locations. Clocks and counters may be paused or stopped, or may be free-running. Muxes may be complex multi-bit coupling or routing logic that select from among many sources and pass many bits through in parallel.

Rather than send the full address (index and offset) to the assigned processor separately from the descriptor, the descriptor could explicitly store the offset or the full address. While byte offsets have been described, the offsets may be in words or in some other unit, and may be scaled. Bytes may be re-ordered in various formats, such as when using little-endian or big-endian ordering, or for other purposes.

Different numbers and arrangements of processors, tribes, banks, ports, and other design components may be used. While 48 processors per tribe have been described, each tribe could have 8 processors, 16 processors, or some other number of processors. Processors 16 (FIG. 5) may have local cache memory or may be able to access other memories besides banks 12. Processors 16 may use banks 12 as scratch-pad memory and as packet memory. Packets may be moved from banks 12 to another memory, or may initially or finally reside in another memory. Multi-processor tribes 10 may contain many other blocks not shown, such as memory controllers for external memories, interrupt logic and prioritizers, test and debug logic, etc. Packet ordering logic may also be added, such as to prioritizer 446 or in other places.

Packet-transfer memory 40 may be part of a larger memory such as an internal static random-access memory (SRAM), DRAM, electrically-erasable programmable read-only memory (EEPROM), or other kind of memory that may include other memories such as internal packet descriptor table 54 and various buffers.

One or more multi-processor tribes 10 may be integrated together on a single chip with packet-transfer memory 40 and central packet-transfer controller 42 (FIG. 9), or multi-processor tribes 10 may be on separate chips. Various levels of integration and partitionings of blocks are contemplated. Each processor may operate on a separate packet, or multiple processors may operate on a single packet, or various combinations.

While staggered inputs to muxes 26 (FIGS. 6A-B) have been shown, staggering may be achieved in other ways. The control inputs to muxes 26 could each be delayed by different numbers of cycles, while the data inputs are in the same order for many or all of muxes 26. Selection of inputs is still staggered in this alternative embodiment since the control inputs to muxes 26 are staggered in time, even though the physical inputs to muxes 26 are not staggered. Multiple levels of muxing could also be substituted, or a cross-bar switch or other switching fabric could be used.

Sequences, counting, and arithmetic may be in binary, gray-code, or some other order or coding that does not have to be numerically ascending or descending. A table may be needed to describe an order that is repeated. A round-robin sequence may follow any sequence of requesters in a deterministic order. Some requesters may have more slots than other requesters, and some requesters may appear multiple times in the sequence while other requesters appear only once in the sequence. Time slots may have different lengths. Round-robin is not limited to a binary ordered list and may flip direction of sequencing or jump in the sequence. When all requesters are able to get access to the shared memory over a sequence of time slots, then a worst-case latency can be guaranteed, even if some requesters a give more access time than others.

Other embodiments may use a different number of banks (although a power of 2 is preferred), more than one packet interface, or more (or fewer) ports per tribe. The restriction that one port access the lower banks and the other port access the higher banks may be relaxed. Round-robin may be replaced with other kinds of arbitration. Another type of mechanism that deterministically visits all the sources may be substituted for the arbiter. The size field does not need to be in the first word nor does it need to exist at all. The page size does not need to be set at 2 KB. The page could be larger or smaller, but power of 2 is preferred. A single page has been described as storing only one packet, but several pages (most likely consecutive) could store a single packet. Several packets could be stored in a single page.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A bank-access scheduler comprising:
a plurality of requester inputs for carrying requests for memory access to a shared memory from a plurality of requestors;
a plurality of bank interfaces to the shared memory, each bank interface for accessing a bank of the shared memory, wherein banks are interleaved with a bank granularity;
a plurality of request selectors coupled to the plurality of bank interfaces, each request selector for selecting a selected requester from the plurality of requester inputs to the request selector; and
staggering means for staggering connection of the plurality of request inputs to the plurality of bank interfaces wherein each request input is connected to a different bank interface in the plurality of bank interfaces for each time-slot in a sequence of time-slots;
wherein the plurality of requesters comprises:
a packet interface for requesting writing of incoming packets from an external network to the shared memory;
a plurality of multi-processor tribes, each multi-processor tribe comprising a plurality of processors, each processor for operating on a packet written to the shared memory by the packet interface;
wherein an incoming packet from the packet interface is written to a next-available bank in the shared memory;
wherein a first bank in the shared memory is a page-start bank for storing a start of an aligned page;
wherein an offset bank in the shared memory does not contain the start of the aligned page;
wherein the aligned page starts at an address having all zero address bits for address bits having a significance less than a size of the aligned page;
wherein the next-available bank is an offset bank when the incoming packet arrives when the first bank is not immediately available to be written by the packet interface;
whereby requests are connected to banks of the shared memory in a staggered fashion and whereby incoming packets are able to be written to the offset bank as the next-available bank.

2. The bank-access scheduler of claim 1 wherein the staggering means comprises staggering connections of requestor inputs to physical inputs to the plurality of request selectors, wherein each requestor input is applied to different logical inputs in a sequence of logical inputs of each request selector, whereby physical connection of inputs to the plurality of request selectors is staggered.

3. The bank-access scheduler of claim 1 wherein the sequence of time-slots comprises 8 time-slots;
wherein the plurality of request selectors comprises 8 request selectors and the shared memory comprises 8 banks.

4. A bank-access scheduler comprising:
a plurality of requestor inputs for carrying requests for memory access to a shared memory from a plurality of requesters;
a plurality of bank interfaces to the shared memory, each bank interface for accessing a bank of the shared memory, wherein banks are interleaved with a bank granularity;
a plurality of request selectors coupled to the plurality of bank interfaces, each request selector for selecting a selected requestor from the plurality of requestor inputs to the request selector; and
staggering means for staggering connection of the plurality of request inputs to the plurality of bank interfaces wherein each request input is connected to a different bank interface in the plurality of bank interfaces for each time-slot in a sequence of time-slots;
a time-slot counter for generating a count value that varies for each time-slot in the sequence of time-slots;
wherein the count value is applied as a select input to the plurality of request selectors;
a packet-offset generator, coupled to the time-slot counter, for generating a packet offset that indicates a starting location within a page in the shared memory for storage of an incoming packet;
wherein the packet offset is a function of the count value from the time-slot counter whereby the count value controls selection by the plurality of request selectors and whereby requests are connected to banks of the shared memory in a staggered fashion.

5. The bank-access scheduler of claim 4 wherein the packet offset is generated as the count value from the time-slot counter multiplied by the bank granularity.

6. The bank-access scheduler of claim 5 wherein incoming packets have a size that is variable from packet to packet.

7. A bank-access scheduler comprising:
a plurality of requester inputs for carrying requests for memory access to a shared memory from a plurality of requesters;

a plurality of bank interfaces to the shared memory, each bank interface for accessing a bank of the shared memory, wherein banks are interleaved with a bank granularity;

a plurality of request selectors coupled to the plurality of bank interfaces, each request selector for selecting a selected requester from the plurality of requester inputs to the request selector; and staggering means for staggering connection of the plurality of request inputs to the plurality of bank interfaces wherein each request input is connected to a different bank interface in the plurality of bank interfaces for each time-slot in a sequence of time-slots;

wherein each multi-processor tribe further comprises:

a slot scheduler receiving random-access requests from a plurality of processors, for generating a stream of requests for access to the banks of the shared memory in a sequence of banks that are accessible by the slot scheduler during the sequence of time-slots;

wherein the slot scheduler further comprises:

a priority counter that advances through a priority sequence when a processor in the plurality of processors has a requests selected for access to the banks;

a direction bit that is toggled when the priority counter wraps around to a reset value, the direction bit indicating a direction of priority in the priority sequence; and a request selector that chooses a highest-priority request from the plurality of processors using the priority sequence and the direction bit, wherein request starvation is prevented and a minimum worst-case latency is provided;

whereby requests are connected to banks of the shared memory in a staggered fashion and whereby random-access requests are converted to the stream of requests to banks of the shared memory in the sequence of banks.

8. A packet-processing system comprising:

a shared memory divided into a plurality of banks, the plurality of banks being word-interleaved, wherein successive words in a stream of words having a sequence of word-incremented addresses are stored to successive banks in the plurality of banks;

a plurality of requesters that request access to the shared memory, the plurality of requesters comprising:

a packet interface coupled to an external network, the packet interface receiving incoming packets from the external network and outputting egress packets to the external network;

a first multi-processor tribe;

wherein the first multi-processor tribe comprises:

a plurality of processors, each processor for operating on a packet initially stored in the shared memory by the packet interface; and a slot scheduler that receives requests from the plurality of processors and generates a pseudo-sequential stream of requests to successive banks in the plurality of banks;

wherein the plurality of requesters form a looping list of requestors;

a parallel staggered round-robin arbiter for connecting the plurality of requesters to the plurality of banks to allow parallel accesses to the shared memory during a time-slot, the parallel staggered round-robin arbiter comprising a plurality of selectors, each selector for controlling access to a bank in the plurality of banks;

wherein each selector selects successive requesters in the looping list of requesters during successive time-slots;

wherein each selector selects a different requester in the looping list of requesters for a first time-slot;

an offset generator, activated by the packet interface writing a start of an incoming packet to a selected bank in the plurality of banks, the offset generator generating an offset for the incoming packet that specifies the selected bank in the plurality of banks;

wherein the selected bank is able to be selected from any bank in the plurality of banks;

wherein the offset is sent to an assigned processor in the plurality of processors for the first multi-processor tribe when the assigned processor is instructed to begin operating on the incoming packet stored in the shared memory;

whereby the offset is generated and sent to the assigned processor to indicate the selected bank storing the start of the incoming packet and whereby selectors stagger selection of successive requesters in the looping list of requesters to successive banks for parallel access to the shared memory.

9. The packet-processing system of claim 8 further comprising:

a second multi-processor tribe;

wherein the second multi-processor tribe comprises:

a second plurality of processors, each processor for operating on a packet initially stored in the shared memory by the packet interface; and a second slot scheduler that receives requests from the second plurality of processors and generates a pseudo-sequential stream of requests to successive banks in the plurality of banks;

wherein the plurality of banks comprises 8 banks and the looping list of requesters comprises 8 requesters, wherein 8 banks are accessible in parallel for each time-slot.

10. The packet-processing system of claim 9 wherein the plurality of requesters further comprises:

a control interface for sending data from the shared memory to an external host processor.

11. A packet-processing system comprising:

a shared memory divided into a plurality of banks, the plurality of banks being word-interleaved, wherein successive words in a stream of words having a sequence of word-incremented addresses are stored to successive banks in the plurality of banks;

a plurality of requesters that request access to the shared memory, the plurality of requesters comprising:

a packet interface coupled to an external network, the packet interface receiving incoming packets from the external network and outputting egress packets to the external network;

a first multi-processor tribe;

wherein the first multi-processor tribe comprises:

a plurality of processors, each processor for operating on a packet initially stored in the shared memory by the packet interface; and a slot scheduler that receives requests from the plurality of processors and generates a pseudo-sequential stream of requests to successive banks in the plurality of banks;

wherein the plurality of requesters form a looping list of requestors;

a parallel staggered round-robin arbiter for connecting the plurality of requesters to the plurality of banks to allow parallel accesses to the shared memory during a time-slot, the parallel staggered round-robin arbiter comprising a plurality of selectors, each selector for controlling access to a bank in the plurality of banks;

wherein each selector selects successive requesters in the looping list of requesters during successive time-slots;

wherein each selector selects a different requester in the looping list of requesters for a first time-slot;

wherein the slot scheduler comprises:

a bank counter, synchronized to the parallel staggered round-robin arbiter, for generating a bank count indicating a current bank in the plurality of banks that the multi-processor tribe can access during a current time-slot;

a bank matcher, receiving a plurality of requests from the plurality of processors in the multi-processor tribe, for selecting matching requests matching the bank count from the bank counter; and a prioritizer that selects a current request from the matching requests from the bank matcher, the current request being sent to the parallel staggered round-robin arbiter during the current time-slot for access to the current bank, whereby multiple requests from processors are matched to the bank count and prioritized to select the current request and whereby selectors stagger selection of successive requesters in the looping list of requesters to successive banks for parallel access to the shared memory.

12. The packet-processing system of claim 11 wherein each selector comprises an N-to-1 multiplexer for selecting from among N requesters in the looping list of requestors.

13. The packet-processing system of claim 11 wherein a frequently-accessed field of the incoming packet is able to be stored in any bank in the plurality of banks, whereby frequently-accessed fields of a plurality of incoming packets are stored across all banks of the shared memory.

14. A method for streaming an incoming packet into a shared memory for operating on the incoming packet in a packet processor comprising:

receiving the incoming packet from an external network at a packet interface;

determining a next bank in a plurality of interleaved banks, the next bank being accessible by the packet interface during a next time-slot while other banks in the plurality of interleaved banks are not accessible by the packet interface during the next time-slot;

writing a start of the incoming packet to the next bank during the next time-slot;

subsequently writing a remainder of the incoming packet to a sequence of banks in the plurality of banks over a sequence of time-slots that follow the next time-slot;

generating a packet offset for the incoming packet from an indicator of the next bank, the packet offset indicating an offset from a start of a page aligned to a first bank in the plurality of banks; and sending the offset and a page identifier that identifies a memory page containing the incoming packet to an assigned processor in a plurality of processors, whereby incoming packets are streamed into the shared memory at offsets to memory pages.

15. The method of claim 14 further comprising:

operating on the incoming packet by executing instructions on the assigned processor, and reading the incoming packet in the shared memory by requesting access to the shared memory using the offset and page sent to the assigned processor to locate the incoming packet in the shared memory, wherein the start of the incoming packet is stored to the next bank before the offset is sent to the assigned processor.

* * * * *